April 14, 1925.

D. J. CAMPBELL 1,533,220

MOLDING APPARATUS

Filed Oct. 16, 1922

Inventor
Donald J. Campbell
By Frank E. Liverance, Jr.
Attorney.

April 14, 1925.

D. J. CAMPBELL

MOLDING APPARATUS

Filed Oct. 16, 1922

Inventor
Donald J. Campbell
By Frank E. Liverance, Jr.
Attorney.

April 14, 1925.  
D. J. CAMPBELL  
MOLDING APPARATUS  
Filed Oct. 16, 1922 9 Sheets-Sheet 5

1,533,220

Inventor  
Donald J. Campbell  
By Frank E. Liverance, Jr.  
Attorney.

April 14, 1925.  
D. J. CAMPBELL  
MOLDING APPARATUS  
Filed Oct. 16, 1922  
1,533,220  
9 Sheets-Sheet 6

Inventor  
Donald J. Campbell  
By Frank E. Liverance, Jr.  
Attorney.

April 14, 1925.                D. J. CAMPBELL                1,533,220
MOLDING APPARATUS
Filed Oct. 16, 1922         9 Sheets-Sheet 7
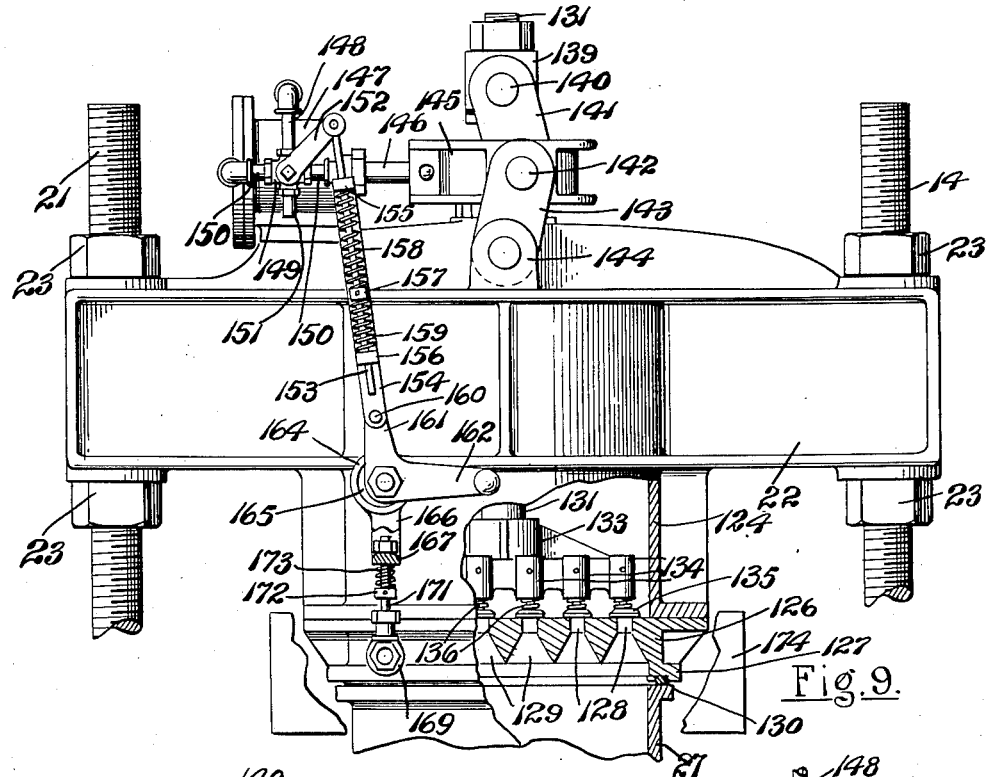
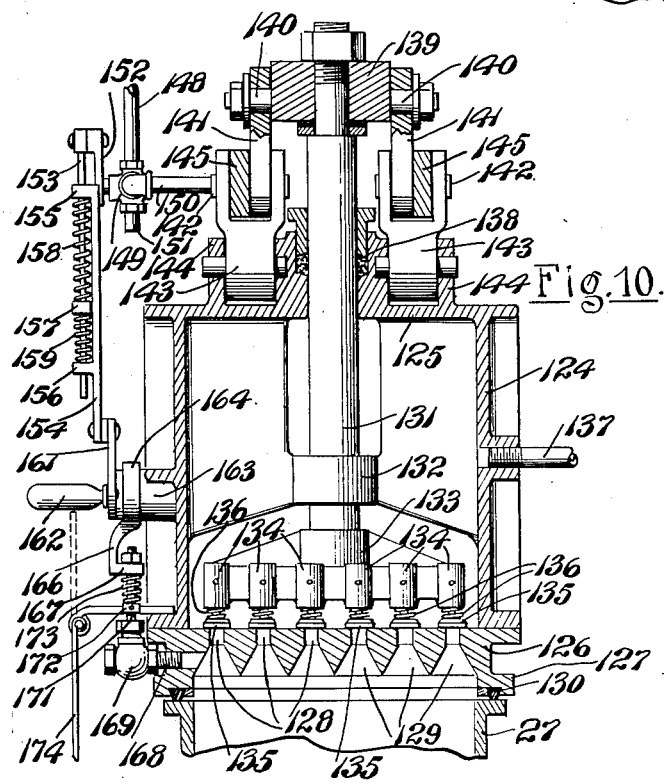
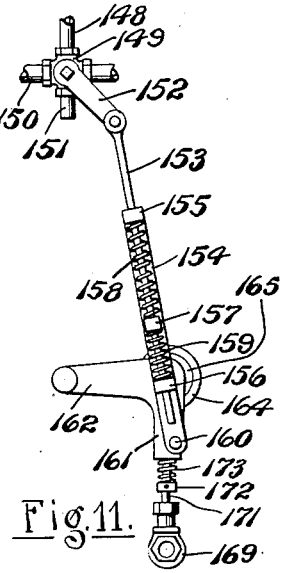
Inventor
Donald J. Campbell
By Frank E. Liverance, Jr.
Attorney.

April 14, 1925.                                           1,533,220
D. J. CAMPBELL
MOLDING APPARATUS
Filed Oct. 16, 1922        9 Sheets-Sheet 8

Inventor
Donald J. Campbell
By Frank E. Liverance, Jr.
Attorney.

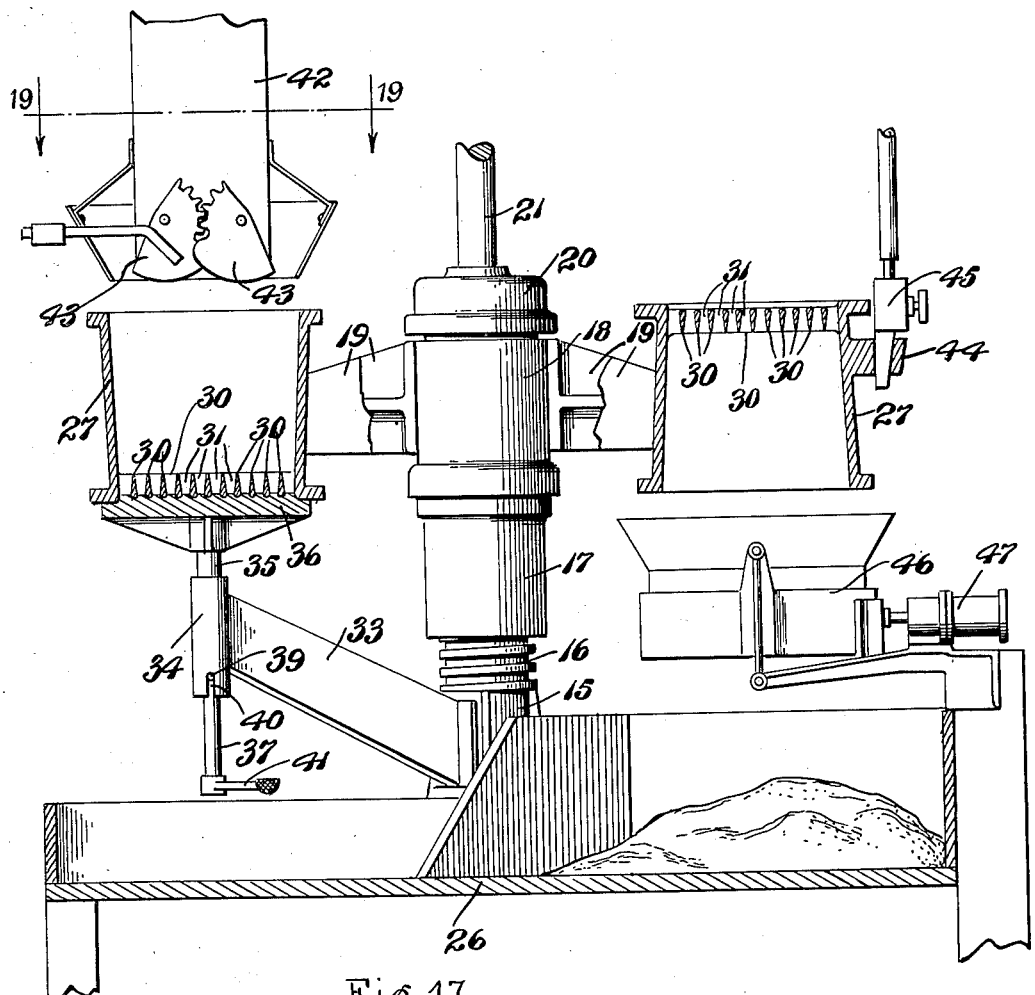
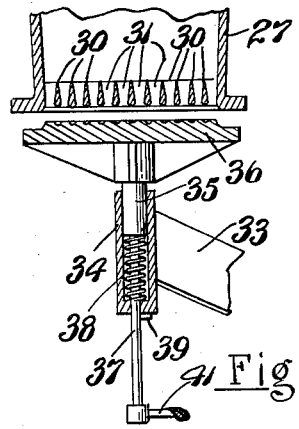
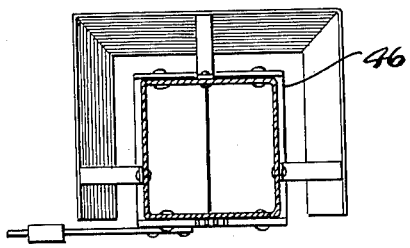
Fig. 17.
Fig. 18.
Fig. 19.

Patented Apr. 14, 1925.

1,533,220

UNITED STATES PATENT OFFICE.

DONALD J. CAMPBELL, OF MUSKEGON HEIGHTS, MICHIGAN.

MOLDING APPARATUS.

Application filed October 16, 1922. Serial No. 594,803.

*To all whom it may concern:*

Be it known that I, DONALD J. CAMPBELL, a citizen of the United States of America, residing at Muskegon Heights, in the county of Muskegon and State of Michigan, have invented certain new and useful Improvements in Molding Apparatus; and I do hereby declare the following to be a full, clear, and exact description of the invention, such as will enable others skilled in the art to which it appertains to make and use the same.

This invention relates to molding apparatus, designed for use in the quantity production of moulds from green sand, the mechanism being chiefly operated by compressed air for the projection of the sand into the flasks around the pattern, and for the compression of the sand when it has been forced into the flask for a required density of sand in the mould which may not be obtained solely through the compressed air projection of sand into the flask. The machine or apparatus is designed for a substantially continuous operation, moulds being rapidly made one after the other, and with each operation of the sand projection portion of the apparatus, the hopper which has carried the sand and from which it has been forced is moved away to make room for a succeeding hopper, the first hopper when moved away being again filled with sand before it comes to discharge position again. In addition, each hopper passes by or through a station where it may be entirely cleaned of the sand which, after several operations may become too dense or packed too hard for proper operation, the cleaning, however, not taking place every time after sand projection, but only at intervals, usually about every tenth operation. Furthermore, the machine or apparatus is equipped with novel constructions for sealing the hopper against escape of air when it is actuated by the compressed air to deliver a charge into the flask, and with further means for elevating the flasks when required for compressing the sand mould, particularly at its upper side where its density is less than it should be. The apparatus is further equipped with many novel mechanisms for controlling the air, giving it its desired course of travel, insuring against a wrong operation of the air controls at certain times, and generally is fully and completely designed for the practical production of moulds in quantity and with great speed.

It is an object and purpose of the invention to provide an apparatus having the above noted qualities, as well as many others not at this time specifically outlined, but which will appear as the description of the construction shown in the accompanying drawings progresses, in which drawings, Fig. 1 is an elevation of the complete machine or apparatus.

Fig. 9 is a fragmentary enlarger front elevation of the upper portion of the apparatus, showing the air containing chamber and the control mechanism associated therewith.

Fig. 10 is a central vertical section therethrough.

Fig. 11 is a fragmentary elevation of the manually operable control device for operating the air valves used between the air chamber and the sand hopper.

Fig. 17 is a fragmentary elevation, with parts in section showing the filling and cleaning stages of the sand hoppers.

Fig. 18 is a fragmentary vertical section of the supporting and sand stopping pedestal used at the hopper filling station of the apparatus, and Fig. 19 is a fragmentary plan, partly in section of a sand riddler which is located at the hopper cleaning station.

Like reference characters refer to like parts in the several figures of the drawings.

Figure 1:
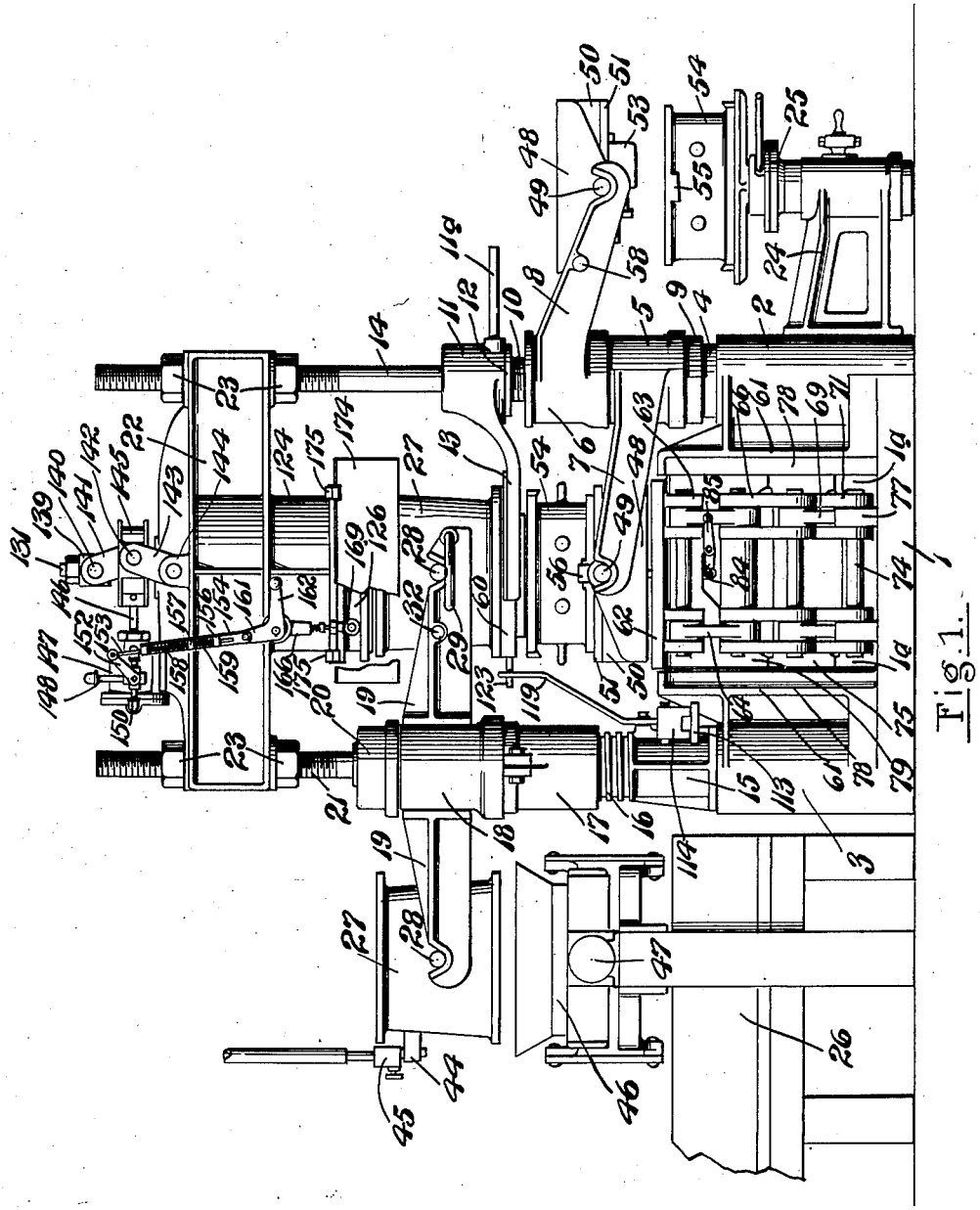
Figure 2:
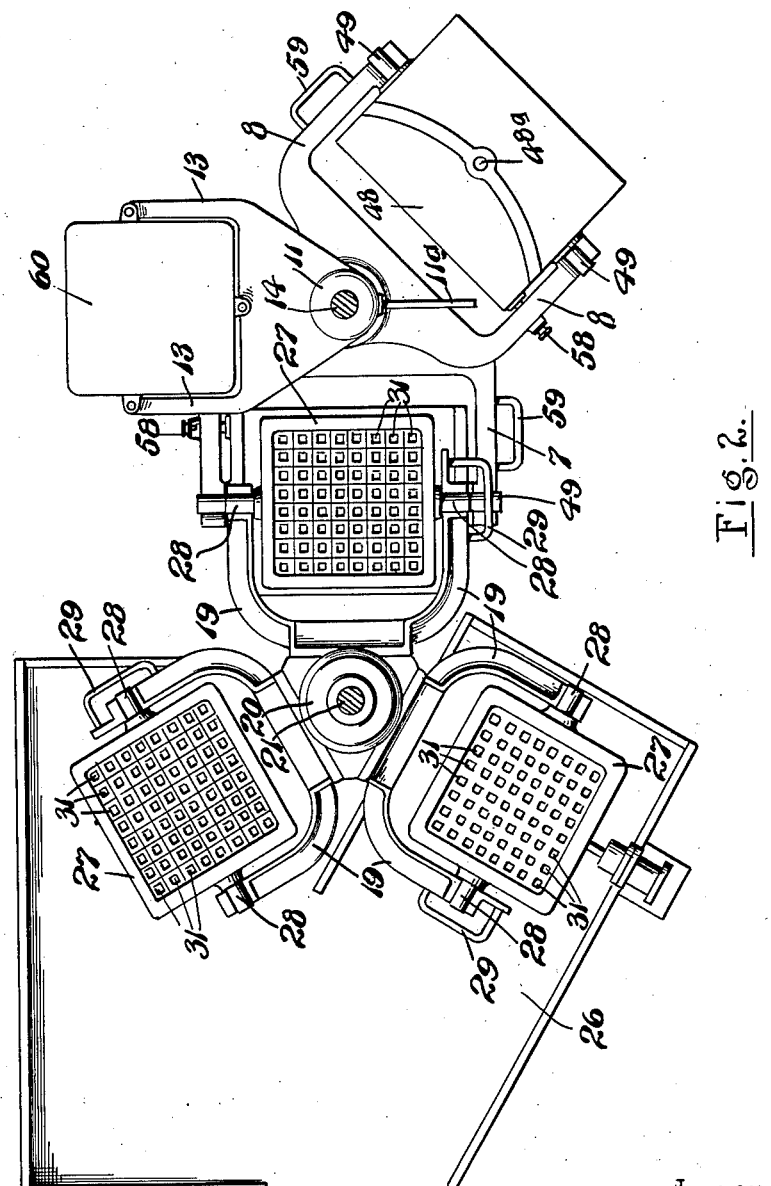
Fig. 2 is a horizontal section through the apparatus at a point below the upper air chamber, the mechanism below being shown in plan.

In the construction of the apparatus, a heavy base 1 of metal is used from opposed side edges of which vertical supporting sleeves 2 and 3 extend. A post 4 extends upwardly from the sleeve 2, on which two collars 5 and 6 are rotatably mounted, one over the other, from which yoke arms 7 and 8, respectively, extend and between which the pattern carrying boxes are rotatably mounted as will later appear. The ends of the arms 8 and 7 are in the same horizontal plane, arms 7 being inclined upwardly and arms 8 downwardly, as shown. The lower collar 5 rests on an adjusting collar 9 threaded on the post 4 whereby both collars 5 and 6 may be adjusted within the limited distances required for properly positioning the pattern carrying boxes with reference to the other parts of the machine between which they go. Above the upper collar 6, the post 4 is reduced in size or has a smaller post 10 connected thereto on which a collar 11 is mounted for rotation, resting on an adjusting member 12 threaded on the part 10. Yoke arms 13 extend from the collar 11 between which the squeezer filler is secured, as will later appear, and an operating handle 11ª extends in an opposite direction from collar 11 for manually turning the same to different positions. Above the collar 11, a rod 14 extends, being permanently connected at its lower end to the part 10 and extending vertically therefrom.

On the opposite side of the apparatus, a supporting member 15 is located above the sleeve 3, above which is a threaded post 16 on which an adjusting sleeve 17 is adjustably mounted, a second sleeve 18 resting on the sleeve 17 and having free rotation about the post 16. Three sets of yoke arms 19 extend from the sleeve 18 in the same horizontal plane between which the three sand hoppers are rotatably mounted, as will later appear. A cap 20 is located above the sleeve 18 and a rod 21 extends vertically from the post 16 above said cap, paralleling the rod 14. A heavy cross supporting beam 22 is located between the rods 14 and 21 which pass through the ends of the beam, resting on nuts 23 threaded on to the rods, and being securely held against movement by other nuts 23 threaded on the rods against the upper sides of the beam. The possibility of adjustment of the beam is apparent.

At the outer side of the lower supporting sleeve 2, an outwardly extending bracket 24 is secured at the outer end of which a mould drawing and levelling device 25 is located, constructed in accordance with the disclosure in my pending application for patent thereon, Ser. No. 443,749, filed Feb. 10, 1921. As it forms no particular part of the present invention it need not be specifically described.

At the opposite side of the apparatus from that at which the levelling device is placed, a sand holding bin 26 is placed, being of relatively large size so that the sand hoppers in their movements about the post 16 pass thereover and are located thereover at two distinct stages, which I have named the filling and the cleaning stages or stations. These hoppers, indicated at 27 have vertical sides tapering slightly inward from top to bottom edges, and trunions 28 project from opposite sides to be received in bearings therefor in the ends of the arms 19. One of the arms 19 of each pair of yoke arms is provided with a handle whereby the entire construction mounted on the sleeve 18 may be turned manually whenever desired. The hopper is open at both ends except that at one end, normally the lower end when the hopper is used, a series of parallel bars 30 cross each other and make a grating in effect with openings 31 therethrough. The bars come to a narrow edge at their upper sides and gradually increase in thickness downwardly, being formed with rounded under edges, whereby the openings 31 are smaller at their lower than at their upper ends. It is apparent that the hoppers may be turned over on the trunions 28, and as a means for holding the hoppers in fixed position with reference to the arms 19, releasable catches 32 are used, as shown in Fig. 1.

From the member 15, a supporting bar 33 (see Fig. 17) extends outwardly for a distance over the bin 26, at its end terminating in a vertical sleeve 34. A short rod 35 is loosely mounted in the upper end of the sleeve at its upper end above the sleeve carrying a table 36 having its upper surface shaped to fit into the under side of the hopper 27 and come into conjunction with the under edges of the grate bars 30. A rod 37 of smaller diameter extends from the rod 35 downwardly through the bottom of the sleeve 34 and a spring 38 within the sleeve around the rod 37 has a normal tendency to elevate the table. A pin 39 extends from the rod 37 below the lower end of sleeve 34 and is adapted to seat in a slot 40 in the side of the sleeve when the table is in upper position, thereby holding the table from rotation. A foot operated arm 41 is attached to the lower end of the rod 37 and it is obvious that the table may be drawn to a lower position and the rod 37 turned so as to carry pin 39 away from the slot 40, thereby holding the table locked in lower position, as shown in Fig. 18, whereupon the hopper is free to move therefrom. When in its upper position, as shown in Fig. 17, the table engages with the grating in the hopper, holding the hopper in secure relation to the table and directly under a sand carrying chute 42, the lower ends of which is closed by movable closures 43 which may be manually opened whenever a hopper is to be filled. Any excess falls on to and is contained within the bin 26. After filling the table 36 is lowered and held in such position whereupon the hopper may be moved to discharging position, as will hereafter be described. At times, possibly every tenth operation before filling with a fresh charge of sand, it is desirable that the hopper be freed and cleaned of any sand left from the previous operations, and I have provided means therefor, the hoppers being provided with projections 44 with which a pneumatic vibrator 45 may engage to vibrate the hopper and jar any sand remaining therein out, as shown at the right in Fig. 17, the hopper being turned over and inverted during this operation. When one hopper is at the filling station, another is at the cleaning station. The sand falling therefrom drops into any desired construction of sand riddler, shown at 46 which may be pneumatically operated by mechanism, indicated at 47.

After a hopper is filled with sand it is carried to the flask which is to receive the sand between the side supporting members. Between the arms 7 and 8 of the two yoke members connected with collars 5 and 6, flask carrying members 48 are mounted on trunnions 49. From the bottom of each member 48 upright sides 50 extend at the upper edges of which a pattern board 51 is secured formed with a plurality of openings 52 therethrough outside of the limits of the pattern 53 which is connected to the upper side of the board. A flask 54 having vertical sides and open upper and lower ends is placed on the board, the board and flask having wedge-like projections 55 with which detachable securing clamps 56 of ordinary construction are adapted to engage to detachably secure the flask to the pattern board. In practice the upper end portion of the flask may be provided with a plurality of spaced apart cross vanes 57 for better holding of the sand, though this is not at all essential. Latch members 58 mounted on the arms 7 and 8 are designed to engage with the member 48 to hold it against rotation when it is moved to the filling position for the flask and after it is turned through a half revolution above the levelling device at 25 where the filled flask is removed, by taking off the securing clamps 56, as shown in Fig. 1. The yokes on which the flask and pattern holding members are mounted are equipped with handles 59, similar to handles 29 previously described, for manually moving the flasks to place under the hoppers for the reception of the sand charge therefrom.

Figure 4:
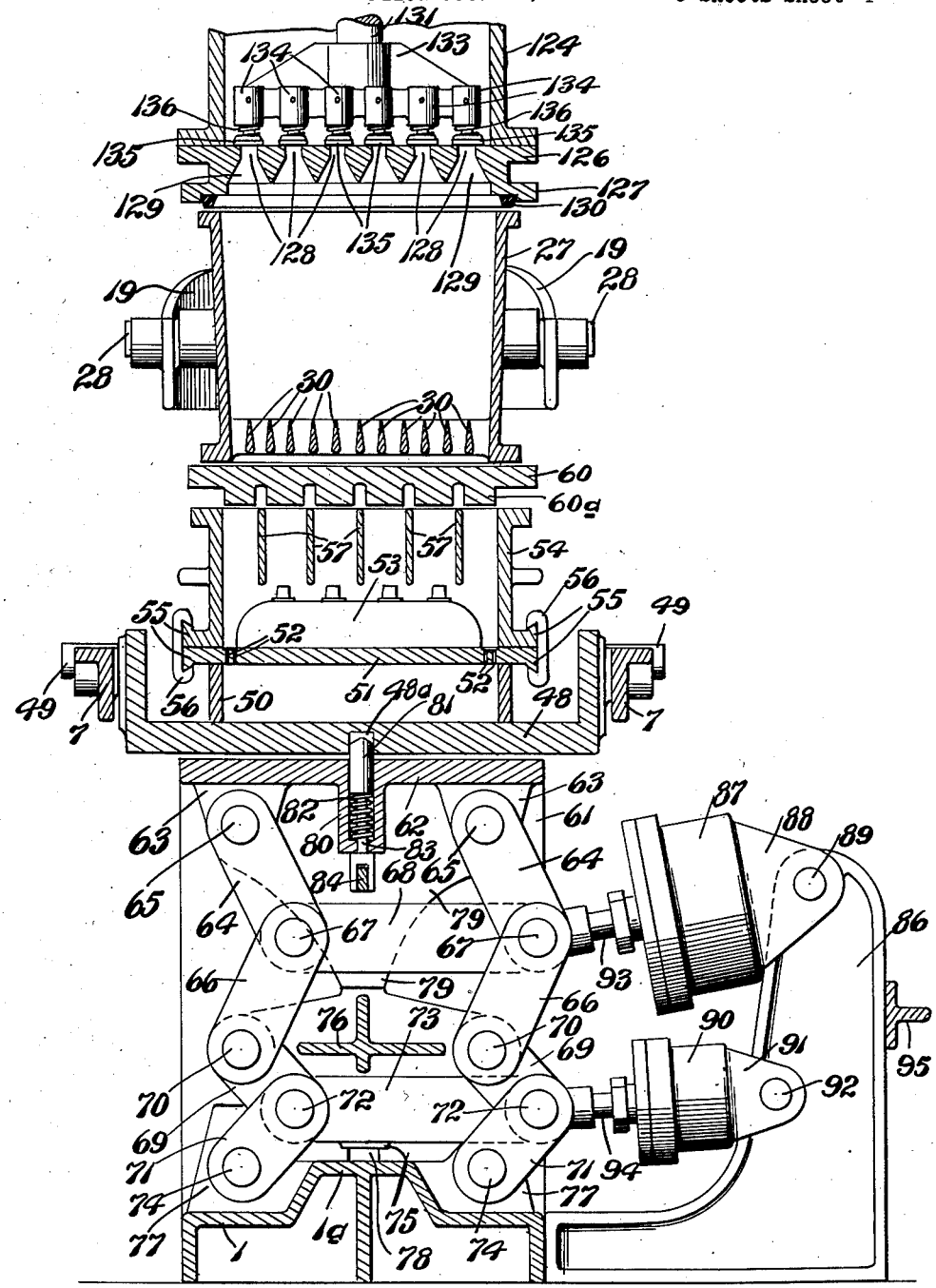
Fig. 4 is a like view showing the same apparatus as it is positioned for the placing of the squeezing filler between the hopper and flask.

Between the arms 13 a filling block 60 is permanently secured to be used in the compressing operation, as hereafter described, said block having a downwardly extending under portion 60$^a$ which may be grooved on its under side to correspond with the vanes 57, as shown in Fig. 4. This block may be varied in form for different flasks and applied to and between the arms 13 by removal and replacement of the securing devices used therewith.

Extending upwardly from the base 1 at the inner sides of sleeves 2 and 3 are vertical walls 61, between which, at their upper ends is a horizontal table 62 on to which the flask holding members 48 are moved when in position for a projection of sand into the flask. Ears 63 project downwardly from the table at opposite sides thereof with which toggle links 64 have pivotal connection at their upper ends at 65. Additional toggle links 66 are pivotally connected at their upper ends to the lower ends of the links 64, at 67, the pivot members in all cases comprising rods, as shown in Fig. 1 which extend across from the links at one side of the apparatus to those at the other side. The two rods 67 at the front and rear of the apparatus are connected by a bar 68.

A second toggle construction with links of shorter length is located below the first toggle construction described, links 69 at their upper ends and links 66 at their lower ends being pivotally connected to rods 70, and lower links 71 are pivotally connected at their upper ends to the lower ends of links 69 on rods 72, said rods being connected by a bar 73, in the same manner that rods 67 are connected by bar 68. The lower ends of links 71 are pivotally connected at 74 to ears 77 projecting upwardly from the base 1.

A relatively heavy abutment member comprised of vertically extending sides 75 connected by cross webs 76 is carried on the pivots 70 of the lower toggle link construction and in its lowermost position with the toggles collapsed, the lower edges of the abutment member rest on the upraised portions 1ª of the base 1. This abutment member has lateral projections 75ª which are received in vertical guides 78 made in the walls 61. A similar member with sides 79 is carried by the table 62 or the pivots at 65, its laterally extending portions 79ª also being received in the guides 78. When in lowermost position, as shown in Fig. 4, the lower edges of the parts 79 rest against the upper edges of the sides 75 of the lower abutment member, this making a construction which provides a strong and rigid support for the table in the several positions to which it may be moved in the operation of the apparatus.

From the center of the table 62 a housing 80 extends downwardly in which a centering pin or lock 81 is mounted, normally impelled upwardly by a spring 82 within the housing and under the pin so as to extend above the upper side of the table and enter an opening 48ª made in the under side of the bottom of the flask carrier 48, thereby properly positioning the flask with reference to the sand hopper above. A rod 83 extends from the locking pin downwardly to below the housing 80 with which an arm 84 on a rock shaft has connection at its lower end, a handle 85 at the outer end of the rock shaft being manually operated to withdraw the locking pin to free the flask holding member for movement.

Figure 3:
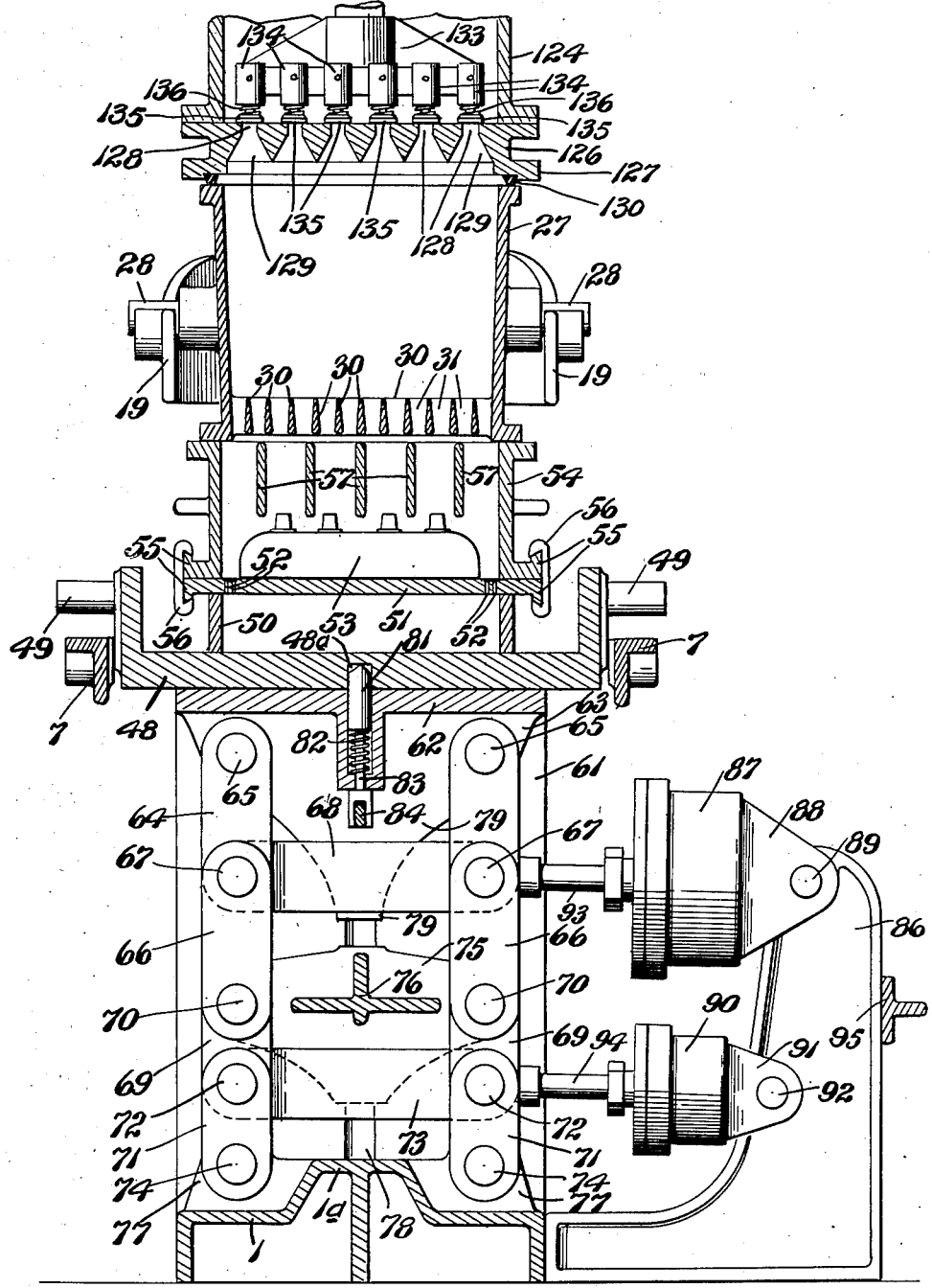
Fig. 3 is a vertical section taken through the operative parts of the apparatus as they appear when a charge of sand is being projected from the sand hopper into the flask.

At one side of the toggle link constructions described, a supporting bracket of relatively large size is located, as indicated at 86. A cylinder 87 is located adjacent the upper end of the bracket, from one end of which, spaced apart ears 88 extend for pivotal attachment at 89 to the upper end of the bracket. A like cylinder 90 is located below the cylinder 87 and at one end has ears 91 which extend to and are pivotally connected to the bracket at 92. Each of the cylinders has a piston therein, and a piston rod 93 from the upper piston connects with one of the rods 67 for the operation of the upper toggle, and a like piston rod 94 from the lower piston connects with one of the rods 72 for operation of the lower toggle, as appears clearly in Figs. 3 and 4.

Figure 5:
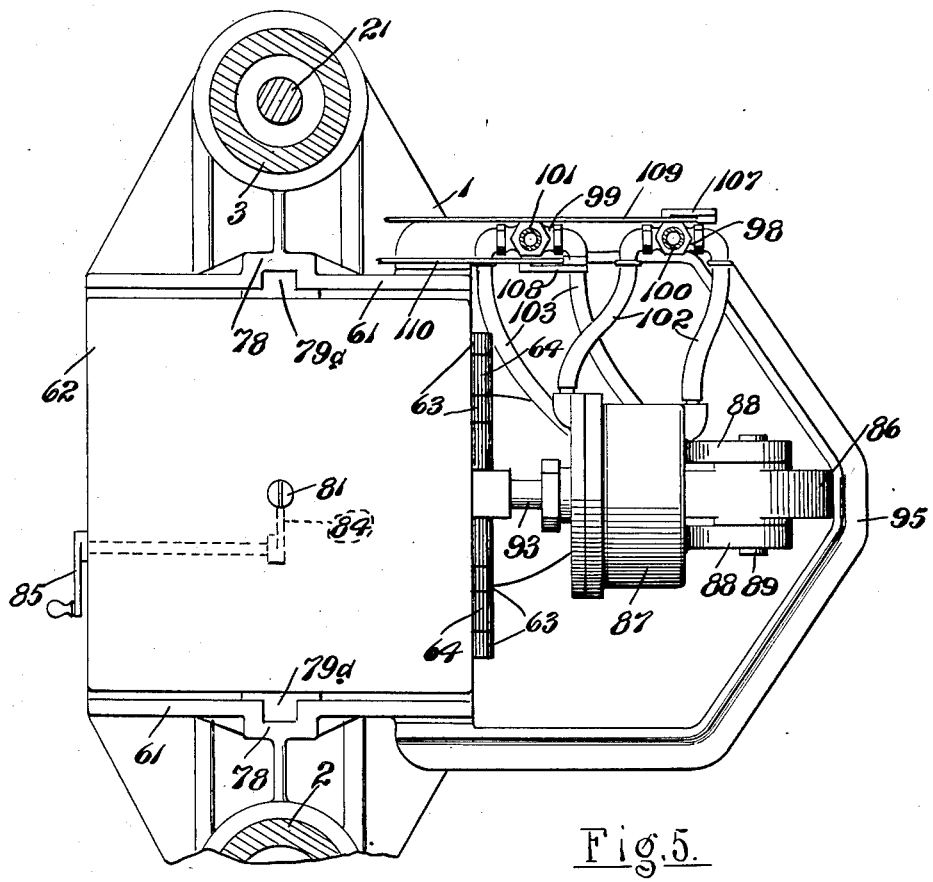
Fig. 5 is a fragmentary horizontal section and plan showing the lower table on which the flask carrier rests, and the air connections for operation of the table upwardly into different positions.
Figure 6:
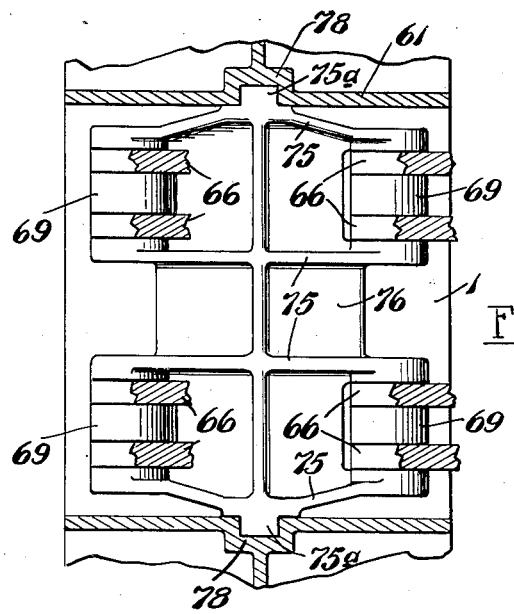
Fig. 6 is a fragmentary horizontal section at a point below said table illustrating the toggle link mechanism and parts associated therewith for changing the position of the table.

A horizontal supporting frame 95 passes around the bracket 86 and is connected at its ends to the walls 61 (see Fig. 5). Two manually operated valves control the passage of compressed air to the cylinders 87 and 90 for operation of the toggles. These valves are mounted on one side of the frame 95, two short lengths of pipe 96 and 97 being connected to the frame and serving as exhaust outlets for air and as supports for the valve casings 98 and 99 connected therewith. A pipe 100 for carrying compressed air to the casing 98 leads into the upper side thereof, and a branch 101 leads into the upper side of valve casing 99. Connecting pipes 102 from opposite sides of the valve casing 98 lead to opposite ends of the cylinder 87 for the carrying of the compressed air to opposite sides of the piston in the cylinder. In like manner pipes 103 lead from opposite sides of the casing 99 to the opposite ends of the lower cylinder 90 for a like purpose.

Figure 12:
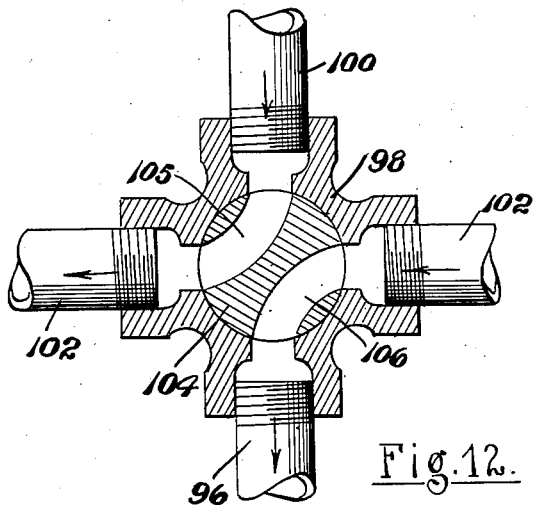
Fig. 12 is an enlarged section through the valve, a number of which are used in the different air lines used in the machine.
Figure 15:
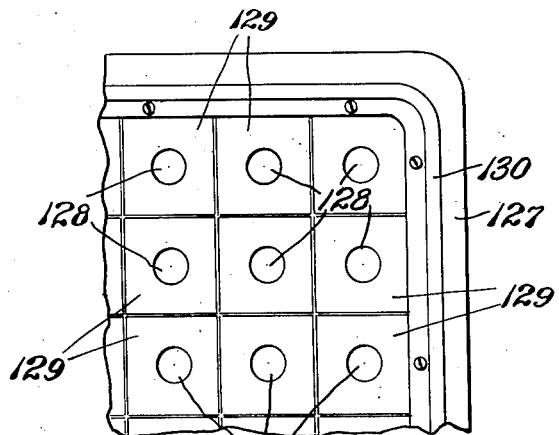
Fig. 15 is a fragmentary under plan of the valve plate located at the under side of the air chamber.

The valves in the valve casings are of identical construction, as shown in Fig. 12, comprising a rotatably mounted cylindrical valve 104 with two curved ways or passages 105 and 106 therethrough, whereby a connection may be made to supply air to one side of the piston in a cylinder 87 or 90, with a simultaneous opening of the cylinder at the opposite side of the piston to exhaust out through the pipe 96 or 97, as the case may be.

Figure 7:
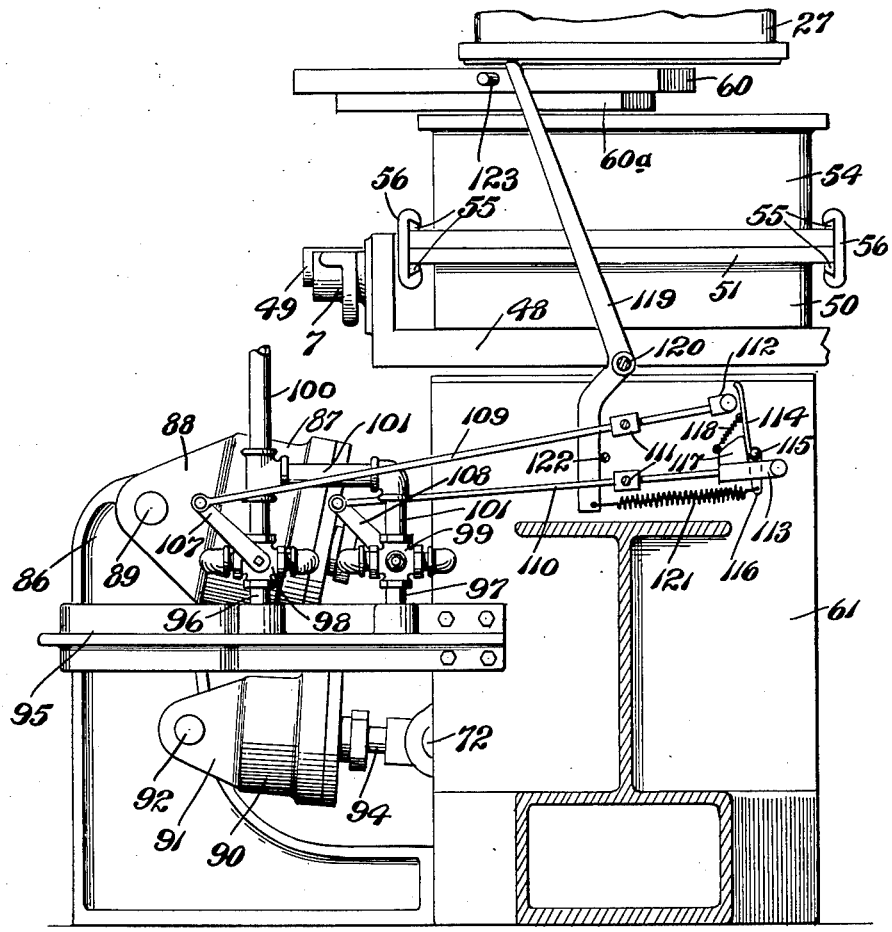
Fig. 7 is a fragmentary side elevation illustrating the air control mechanism for operation of the toggle links.

Operating arms 107 and 108 are connected with the two valves in the casings 98 and 99 to which operating rods 109 and 110 are connected, passing through guides 111 and terminating in handles 112 and 113, respectively. The handle 112 on the upper rod 109 (see Fig. 7) is designed to be inaccessible for operation at times, being covered by a guard plate 114 which is pivotally mounted at 115 a short distance ahead of the handle 113 and is provided with a downwardly extending arm 116 below the pivot. The guard is located back of a stock block 117 immediately ahead of the pivot 115 against which the guard is normally drawn by a spring 118, in which position the guard covers the handle 112 which is not accessible for operation. A lever 119 is pivotally mounted between its ends at 120 on a stationary part of the supporting structure, and a coiled spring 121 connects its lower end with the lower end of the arm 116. A stop 122 is interposed in the path of movement of the lower end of lever 119, to limit its movement in one direction. The upper end of the lever extends upwardly so as to be above the plane of the upper side of the flask 54 and be engaged by a pin 123 extending from the filler and pressing block 60 when said block is moved to place between the sand hopper and the flask.

Figure 8:
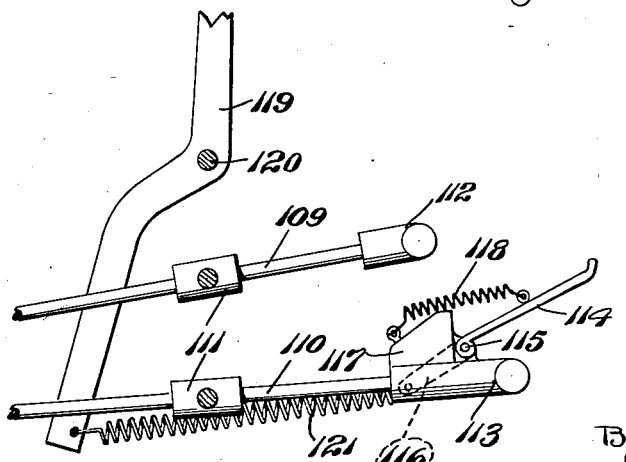
Fig. 8 is a fragmentary enlarger elevation of the operating handles for said control mechanism and the guard used therewith for insuring proper actuation of the handles.
Figure 13:
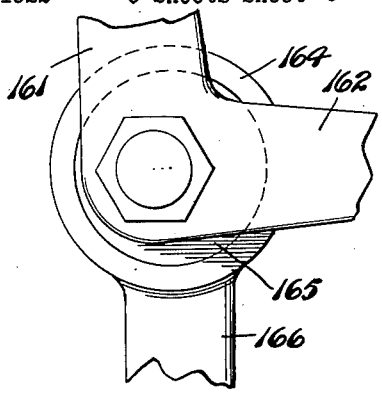
Fig. 13 is a fragmentary elevation of a detail of construction relating to the operation of the air exhaust valve used to relieve the pressure in the hopper after a charge of sand has been forced therefrom.

It is apparent that under ordinary conditions, the valve in casing 98 cannot be operated until after that in the casing 99 has been operated, as the handle 113 will have to be moved away thereby moving guard 114 back from the handle 112 and with said movement the spring 121 will be tensioned, overcoming the spring 118 and moving the guard to the position shown in Fig. 8, whereupon the upper handle is readily grasped. But when the block 60 is swung into place, it automatically actuates lever 119, thereby stretching spring 121 and throwing guard 114 to inoperative position so that the upper handle 112 may be grasped and operated, irrespective of whether the lower handle has been operated.

Integral with the upper beam 22, a centrally positioned air receiving chamber or reservoir 124 is formed having a closed upper end 125 and an open lower end across which a valve plate 126 is placed and secured, at the lower edges of which an outwardly extending annular flange 127 is formed. The valve plate has a plurality of openings 128 made therethrough which flare outwardly and enlarge in all directions, as indicated at 129, so that air passed from the air reservoir through the openings 128 is allowed to expand and when it leaves the plate 126, it substantially fills the entire upper end of the sand hopper and presses against the entire upper surface of the sand therein, the hopper being located directly below the plate 126. A compressible gasket ring 130 is connected with the flange 127 so as to lie directly over the upper edges of the sand hopper and make an air tight joint therewith at the time the compressed air is discharged into the hopper, as will appear.

A relatively large rod 131 is located vertically in the air reservoir 124, passing upwardly through the top 125 thereof, and through a suitable guide 132 within the reservoir, at its lower end below the guide carrying a head 133 formed with a plurality of vertical sleeves 134, one for each opening 128 in the plate 126. A valve 135 covers each opening 128 and has a stem leading into each sleeve 134, a coiled spring 136 being disposed between the valve and its associated sleeve 134 for normally holding the valves in closed position against any unevenness or varying of the surface of the plate 126. On elevation of the rod 131 and attached head, all of the valves are lifted, making a free outlet for the compressed air through the openings 128. It is to be understood that the reservoir is at all times supplied with compressed air, the inlet pipe 137 supplying the same from any suitable source.

The rod 131 passing upwardly through the top 125 of the reservoir, passes through any suitable stuffing box 138, which precludes air escape, and at its upper end is equipped with a cross head 139 to which the upper links 141 of a pair of toggle constructions are pivotally mounted on trunnions 140 extending from the cross head, said links 141, at their lower ends having pivotal connection at 142 with the upper ends of the other links 143 which complete the toggles and which are pivotally connected at their lower ends between ears 144 cast with the top of the air reservoir. A yoke 145 is also connected by the pivots 142 to the toggles, as shown in Figs. 9 and 10, from which a piston rod 146 extends to connect with a piston in an air cylinder 147 mounted on and above the beam 22. Air is supplied to the cylinder through a valve construction practically identical with those described for controlling the operation of the pistons in cylinders 87 and 90. The air is carried through feed pipe 148 to the upper side of the valve casing 149 from opposite sides of which pipes 150 lead to the opposite ends of the cylinder, the valve casing having an exhaust outlet 151 at its lower side. The valve within the casing is identical with that shown in Fig. 12, and the operation thereof is through an arm 152 connected therewith for turning the valve between its two positions.

A rod 153 is connected at one end to the end of the arm 152 and extends alongside a bar 154 from which lugs 155 and 156 extend laterally, the rod passing therethrough. A block 157 is adjustably secured to the rod 153 at a point between the lugs 155 and 156, and at opposite sides of the block, springs 158 and 159 are located around the rod between the block and the lugs as shown.

Figure 14:
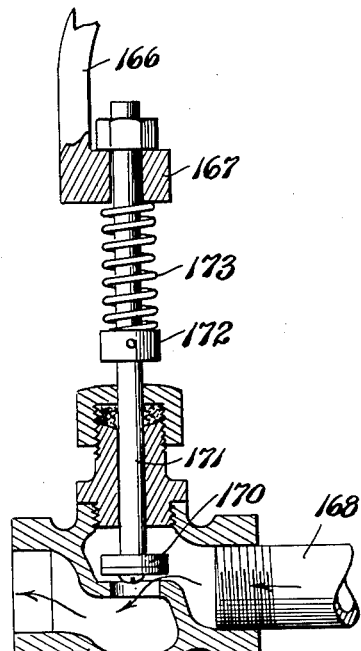
Fig. 14 is a vertical section through the exhaust valve construction and operating connections therewith.
Figure 16:
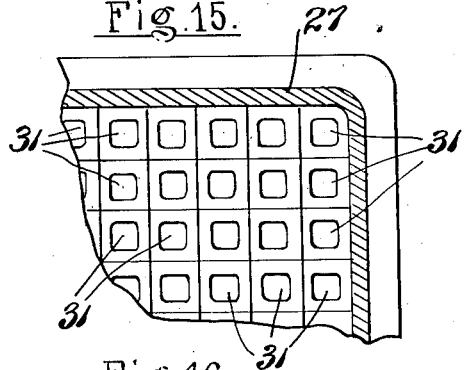
Fig. 16 is a fragmentary horizontal section through a sand hopper.

The bar 154 is pivotally connected at 160 at its lower end to one arm 161 of a bell crank lever, the other arm 162 of which is equipped with an operating handle. The lever is pivotally mounted on an outstanding projection 163 on the reservoir 124. An eccentric housing 164 is mounted on an eccentric 165 connected with and turned on operation of the bell-crank lever, from which housing a bar 166 extends downwardly and terminates in a laterally turned end portion 167. An outlet pipe 168 leads from the valve plate 126 to the outside and connects with a valve casing 169, which is equipped with a valve 170, normally closing the casing against escape of air outward therethrough. A rod 171 is connected with the valve and extends to and through the end 167 of bar 166. A collar 172 is secured to the rod 171 above the valve casing 169, and a spring 173 between the collar and part 167 normally holds the valve 170 in closed position, when free to do so. In practice, however, with the bell-crank lever in either of the positions shown in Figs. 9 or 11, the eccentric is so located that it lifts bar 166 and its end portion 167, holding the valve in the open position shown in Fig. 14, and it is only in an intermediate position of the bell-crank lever between the two extreme positions that the valve 170 is closed, and that only momentarily.

With the toggle members 141 and 143 in the position shown in Fig. 9, the valves 135 are all closed. On grasping the handle arm 162 of the bell-crank lever and swinging it from the position shown in Fig. 9 to that shown in Fig. 11, the compressed air is delivered to cylinder 147 so as to move the piston and carry the toggle levers from the position shown to a position directly opposite, that is with the knuckle at pivot 142 located on the opposite side of the dead center line between the end pivots of the toggle links. At the time of passing dead center, the rod 131 and attached valves 135 are all elevated, momentarily, and a rush of compressed air occurs through the openings 128, and against the sand in the hopper 27 below. At this instant, the eccentric at 165 has moved so that the valve at 170 is closed and the air does not escape but must exert its full force against the sand to force it from the hopper into the flask. As soon as the bell-crank lever has moved far enough over to again close the valves 135, the valve 170 is opened, and an exhaust relief made for the air in the upper portion of the sand hopper which escapes through the valve casing 169. I have provided a guard plate 174, hingedly mounted on brackets 175 on the air reservoir 124 which normally drops down so as to be in front of the outlet end of the valve casing 169 to receive the impact of the exhaust air, and other guard plates of similar form and mountings may be used as guards for the joint between the sand hopper and the gasket 130, so that any air that may escape at this joint will not have any injurious effects as to the workmen, such as blowing sand into their eyes, or the like. It will be noted, referring to Fig. 10, that the guard plate 174, when turned upward as it must be whenever the hopper is moved away from the air reservoir, makes a stop against the movement of the bell-crank handle arm 162, and that the guard must be in its lower operative position whenever a sand charging operation is made followed by an exhaust through the valve casing 169. In the operation, the bell-crank lever is moved from one position to the other, as shown in Figs. 9 and 11, alternately, a discharge of compressed air occurring with each operation, followed immediately by an exhaust from the sand hopper of the air therein through opening of the valve 170.

With a construction as described, the quantity production of sand moulds is greatly facilitated. The sand hoppers 27 are successively brought to the filling, discharging and cleaning stations in their movement about the post 16, at the filling station receiving a charge of sand from the chute 42, moving therefrom to the discharging station directly under the air reservoir and having the greater portion of the sand forced therefrom by compressed air pressure and into the flask 54 directly below, and at the cleaning station having the residue of sand therein removed whenever it may be needed. One of the hoppers is at the filling station, one at the discharging station and one at the cleaning station, as is evident, at all times, merely successively changing position in rotation. Of course, as previously described the cleaning at the cleaning station does not take place in every cycle of operations but only when necessary.

When a flask is to be brought to position for receiving the sand, the table 62 and the toggle links associated therewith are in lowermost position, as shown in Fig. 4. The locking pin 81 is retracted by operating handle 85 and the flask carrying member 48 moved over the table until properly centered for the entrance of the locking pin in the recess 48ª therefor. A hopper is then moved to position between the flask 54 and the gasket 130 on the under side of the air reservoir valve plate. Handles 113 and 112 are successively operated, whereby the table 62 and flask carrier 48 and the flask are elevated, making a tight joint between the lower end of the hopper and the upper end of the flask, and between the upper end of the hopper and the gasket ring 130. The bell-crank lever operating handle 162 is then moved from its one extreme position to the other, discharging the air from the air reservoir into the hopper with a consequent forcing of sand from the hopper into the flask, filling the flask with sand around the pattern 53. The openings 52 in the pattern board 51 allow the passage of air through the sand in the mould and a relief of pressure therein which is advisable in making moulds by this method. The position of the parts of the apparatus for filling the flask with sand is that shown in Fig. 3. It will be noted that the operation of the lower links 69 and 71 first, elevates the abutment member 75 associated therewith which, engaging against the other abutment member 79 elevates the upper links, and that the succeeding operation of the upper links fully elevates the table.

One or more discharges of the compressed air against the sand in the hopper may be made, as experience may dictate. If the sand in the upper end of the flask is not of sufficient density it may be squeezed by use of the filler block 60 as described, and after the flask is filled, the table 62 is lowered to the position shown in Fig. 4, separating the flask from the hopper and leaving space sufficient for the movement of the filler and presser block 60 between them. As described, this introduction of the block automatically frees the upper handle 112 for operation and the same is operated to straighten the upper toggle links 64 and 66, with a consequent elevation of the flask and compression of the sand therein by reason of the entrance of the portion 60ª of the block therein. The lower abutment member 75 bearing on the base 1, makes a firm under support for the upper toggle links, as is evident. After compression, the table 62 is again lowered, and the flask holding member and filled flask thereon are moved to above the levelling device 25 for removal of the flask and mould therein, the block 60 is moved to inoperative position, and another filled hopper moved to take the place of the discharged hopper which is moved to the cleaning station for removal of the more or less compressed and dense remnant of sand left therein, if necessary, and then to the filling station to receive fresh sand for the next operation.

This series of operations may be indefinitely repeated. The use of the three hoppers and double series of flask holders and patterns makes the operation of the machine continuous. All operations except the movement of the hoppers, filler and presser block, and flasks to position are made through the agency of compressed air. The moulds made are uniform and perfect in composition, and in every way the machine or apparatus is practical, durable and efficient. The invention is defined in the appended claims and is to be considered as comprehending all forms of structure coming within the scope thereof.

I claim:

1. In combination, a vertical support, a pattern and flask carrying member mounted to swing in a horizontal plane about said support, a table on to which said member with pattern and flask thereon is carried for filling the flask with sand, a second vertical support, a sand hopper mounted to swing in a horizontal plane about the second support to come over the flask, an air reservoir mounted directly over the table and under which the hopper comes, means for elevating the table to clamp the air reservoir, hopper and flask together, and means for momentarily releasing the air from the air reservoir to the hopper to drive the sand therefrom into the flask, substantially as described.

2. In combination, two vertical supports, a beam connecting the same adjacent their upper ends, a pattern and flask carrying member mounted on one support to swing about the same in a horizontal plane and to a point between the supports, a table between the supports onto which the member is carried, a sand hopper mounted on the other support to swing in a horizontal plane and to a point over the flask on said member, said hopper being adapted to be filled with sand prior to swinging over the flask, a compressed air reservoir carried by said beam over the table, means for supporting the table and mounting it for vertical movements, means for operating said means to elevate the table and clamp the flask against the hopper and the hopper against the air reservoir, and means for momentarily releasing the air in the reservoir to the hopper to drive sand from the hopper into the flask, substantially as described.

3. In an apparatus of the character described, a supporting table, a member having a flask and a pattern therein located on the table, a vertical support, a member mounted to turn in a horizontal plane about said support, a plurality of sand hoppers carried by said member in spaced apart relation to each other, said sand hoppers being movable with said member so as to come over the flask, means for filling the hoppers with sand before coming to the flask, means for applying compressed air to and above the sand in the hopper when over said flask to force the sand from the hopper into the flask, and means for cleaning the hoppers of any residue of sand left after filling the flask, and before filling the hoppers again with sand, substantially as described.

4. A construction containing the elements in combination defined in claim 3, combined with means for mounting each of the hoppers to turn about a horizontal axis whereby in cleaning the hoppers, they are turned over from the position in which they are filled and discharged, substantially as described.

5. In combination, a vertical support, a flask and pattern carrying member mounted to turn in a horizontal plane about said support, a table on to which said member is carried, a locking pin projecting upwardly from the table adapted to enter a recess in the under side of said member, spring means normally elevating the locking pin, and manually operable means for retracting and lowering the pin to inoperative position.

6. In combination, a vertical support, a flask and pattern carrying member mounted to swing about said support in a horizontal plane, said member having a recess in its under side, a table on to which said member is adapted to be swung, a locking pin extending upwardly through the table to enter said recess, a spring normally elevating the locking pin, a rock shaft, an arm on the shaft connected with the pin, and a manually operable handle on the rock shaft for turning the same to retract the pin, substantially as described.

7. In an apparatus of the class described, a vertical support, a plurality of sand receiving hoppers mounted to turn in the same horizontal plane about the support, said hoppers being located in spaced apart horizontal relation, means for filling the hoppers with sand at one point in their movement, means for pneumatically discharging the sand from the hoppers at another point in their movement, and means for cleaning the residue of sand from the hoppers after discharge therefrom at a third point in their movement, substantially as described.

8. In an apparatus of the class described, a vertical support, three sand hoppers mounted to turn in the some horizontal plane about the support, said hoppers being equally spaced apart, means for filling the hoppers successively with sand at one point in their movement, means for discharging the sand from the hoppers at another point in their movement, and means for jarring the residue of sand from the hoppers at another point in their movement, the three hoppers normally occupying said three different points, one hopper at each point, and successively changing positions with each other, substantially as described.

9. In an apparatus of the class described, parallel spaced apart vertical supports, a table located between the supports and mounted for vertical movements, means for pneumatically elevating the table to two different positions, a flask and pattern carrying member mounted to swing in a horizontal plane about one of the supports to a position over the table, a sand carrying hopper mounted to swing in a horizontal plane about the other support so as to be positioned over the flask, an air reservoir carried between the upper ends of the supports under which the hopper moves when located over the flask, means for momentarily releasing air from the reservoir into the hopper to force the sand therefrom into the flask, and a block mounted to swing in a horizontal plane around the first support to be positioned between the hopper and flask after the flask has been filled with sand, said block being adapted to be pressed into the upper end of the flask to compress the mould therein.

10. In an apparatus of the class described, a flask carrying table, two series of toggle levers supporting the table, and two series of pneumatic means connected one with each series of toggle levers for operating the same to straighten the links and elevate the table to two separate positions above its lowermost position.

11. In an apparatus of the class described, a supporting base, two connected series of toggle levers pivotally connected with the base and extending upwardly therefrom, a table carried by the uppermost of said levers, piston rods connected one with each series of levers, an air cylinder containing a piston for each piston rod into which the rods pass, and means for selectively controlling the passage of compressed air to either end of either piston, substantially as described.

12. A construction containing the elements in combination defined in claim 10, combined with an abutment member carried by and movable with each series of toggle levers, one of said abutment members being located directly over the other and being adapted to rest one on the other in lower position, and a base to which the lower toggle levers are connected on which the abutment member associated therewith is adapted to bear when in lowermost position.

13. In an apparatus of the class described, a vertical support, a sleeve rotatably mounted thereon, three pairs of yoke arms projecting radially from the sleeve, a sand receiving hopper located between the outer ends of each pair of arms, trunnions on the hoppers for rotatably mounting said hoppers on the arms, and latches for holding the hoppers against rotatative movement with respect to the arms, substantially as described.

14. In an apparatus of the class described, a sand receiving hopper comprising a shell open at both ends, and a grating located in one end of the hopper formed of a plurality of bars paralleling the sides of the hopper and each other, said bars paralleling two sides of the hopper crossing the other bars paralleling the remaining two sides of the hopper, and said bars tapering to a point substantially from their outer to their inner edges.

15. In an apparatus of the class described, a stationary support, a compressed air reservoir carried by said support, said reservoir having a member at its lower sides formed with a plurality of outlet openings, a rod mounted vertically in the reservoir and extending above the same, a head on the lower end of the rod, a plurality of valves, one for each outlet opening mounted on the head, means for pneumatically elevating the rod momentarily to open the valves, and a sand hopper adapted to be located under the reservoir for receiving the compressed air discharged from the reservoir.

16. In an apparatus of the class described, a stationary support, a compressed air reservoir carried by said support, said reservoir having outlets at its lower side, valves closing said outlets, a head on which the valves are carried, a rod extending from the head through the upper side of the reservoir, a cylinder, means for selectively directing compressed air to either end of the cylinder, a piston rod extending from the cylinder and operated back and forth with respect thereto, and interconnecting means between the piston rod and said first rod for moving the said rod and attached head vertically on movement of the piston rod in either direction to open the valves followed by movement in the opposite direction to close the valves, substantially as described.

17. In an apparatus of the class described, a support, a compressed air reservoir carried by the support, said reservoir having outlets at its lower side, valves closing the outlets, a head on which the valves are carried, a rod extending from the head through the upper side of the reservoir, toggle levers pivotally connected at one end with the upper side of the reservoir and at their other end with the rod, an operating rod connected with the knuckle of the toggle levers, and means for moving said operating rod longitudinally in either direction thereby momentarily elevating the first rod and connected head and valves and then returning them to normal closing position, substantially as described.

18. In an apparatus of the class described, a support, a compressed air reservoir carried thereby, a sand hopper adapted to be located under the reservoir, said reservoir having outlet openings in its under side, valves normally closing said openings, an exhaust outlet located in a side of the reservoir below the air outlets therein, a valve in said exhaust outlet, means normally holding the exhaust valve in open position, and means for momentarily moving the first named valves to open position and simultaneously closing the exhaust valve, followed by closing of the first valves and simultaneous opening of the exhaust valve.

19. A construction containing the elements in combination defined in claim 18, combined with a guard pivotally connected to the reservoir and adapted to depend therefrom to cover the joint between it and the hopper, said guard when turned to upper inoperative position interposing as a stop against operation of the means for actuating the valves.

20. In an apparatus of the class described, an air reservoir for containing compressed air, a plate connected at the lower sides thereof having a plurality of openings therethrough, said openings after a short distance downwardly through the plate flaring outwardly and widening in all directions, a sand hopper adapted to be located under and against said plate, valves normally closing the openings against the passage of air, and means for momentarily lifting the valves for the passage of air through the openings.

21. In an apparatus of the class described, a support, a table, a reservoir carried by the support a distance above the table, a flask and pattern carrying member adapted to be located on the table, a sand hopper adapted to be interposed between the reservoir and flask carried by said member, means operated pneumatically for elevating the table to clamp the flask, hopper and reservoir together, means for momentarily releasing air from the reservoir to the hopper to force the sand in the hopper into the flask, said means for elevating the table being reversed to lower the table and parts supported thereby, a presser block adapted to be located between the hopper and flask, and means for elevating the table a less amount to force the flask upwardly and the block into the flask to compress the sand in the hopper, substantially as described.

22. In apparatus of the class described, a sand hopper, a flask adapted to be located below the same, a reservoir for compressed air under which the hopper is placed, means normally stopping escape of air from the reservoir, means for actuating said stopping means for permitting the momentary passage of air from the reservoir into the hopper, an exhaust outlet for the air in the hopper above the sand, means normally held in an open position for closing said exhaust outlet, and a single means for closing said exhaust outlet closing means and opening passage for air from the reservoir to the hopper, followed by closing said passage of air from the reservoir and opening of the exhaust outlet closing means.

In testimony whereof I affix my signature.

DONALD J. CAMPBELL.